(12) United States Patent
Taylor

(10) Patent No.: US 11,703,138 B2
(45) Date of Patent: Jul. 18, 2023

(54) FLEXIBLE LAMINATE STRUCTURE WITH INTEGRATED ONE-WAY VALVE

(71) Applicant: SONOCO DEVELOPMENT, INC., Hartsville, SC (US)

(72) Inventor: Donald Gregory Taylor, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

(21) Appl. No.: 17/371,426

(22) Filed: Jul. 9, 2021

(65) Prior Publication Data

US 2021/0332894 A1 Oct. 28, 2021

Related U.S. Application Data

(63) Continuation of application No. 16/446,904, filed on Jun. 20, 2019, now Pat. No. 11,112,017.

(51) Int. Cl.
*F16K 15/14* (2006.01)
*B65D 77/22* (2006.01)
*F16K 17/164* (2006.01)

(52) U.S. Cl.
CPC .......... *F16K 15/147* (2013.01); *B65D 77/225* (2013.01); *F16K 17/164* (2013.01)

(58) Field of Classification Search
CPC . B65D 77/225; F16K 15/1402; F16K 15/144; F16K 15/147; F16K 15/1471; F16K 15/148; F16K 15/16; F16K 17/164
See application file for complete search history.

(56) References Cited

U.S. PATENT DOCUMENTS

| | | |
|---|---|---|
| 4,134,535 A | 1/1979 | Barthels et al. |
| 4,205,870 A | 6/1980 | Devries |
| 4,206,870 A * | 6/1980 | DeVries ............... B65D 33/01 426/118 |
| 5,989,608 A | 11/1999 | Mizuno |
| 6,663,284 B2 | 12/2003 | Buckingham et al. |
| 6,776,301 B2 | 8/2004 | Torres-White et al. |
| 7,490,623 B2 | 2/2009 | Rypstra |
| 7,527,840 B2 | 5/2009 | Zeik |
| 8,434,633 B2 | 5/2013 | Beer et al. |
| 8,557,357 B2 | 10/2013 | Lykke et al. |

(Continued)

FOREIGN PATENT DOCUMENTS

WO WO-2019077536 A1 * 4/2019 ........... B65D 77/225

*Primary Examiner* — Hailey K. Do
(74) *Attorney, Agent, or Firm* — Nelson Mullins Riley & Scarborough LLP

(57) ABSTRACT

The invention is directed to a one-way valve for a flexible package which comprises a first film layer having at least one first cut line and a second film layer having at least one second cut line, wherein the lines are offset from one another. An adhesive layer is disposed between the film layers. The film layers and the adhesive layer define a valve area wherein the first film layer and the second film layer are not permanently adhered to each other. The second cut line fluidly connects the interior of the flexible package to the valve area and the first cut line fluidly connects the valve area to the ambient atmosphere surrounding the flexible package. The adhesive pattern within the valve area creates a gas flow channel from the second cut line toward the first cut line.

32 Claims, 9 Drawing Sheets

(56) References Cited

U.S. PATENT DOCUMENTS

| | | |
|---|---|---|
| 8,746,281 B2 | 6/2014 | Morin |
| 8,911,150 B2 | 12/2014 | Gustavsson |
| 9,810,335 B2 | 11/2017 | Gardner et al. |
| 9,868,575 B2 | 1/2018 | Hansen |
| 10,281,050 B2 | 5/2019 | Branyon |
| 2003/0035597 A1 | 2/2003 | Buckingham et al. |
| 2006/0006176 A1* | 1/2006 | Stotkiewitz .......... B65D 77/225 220/89.1 |
| 2006/0030472 A1* | 2/2006 | Hartman ............ B65D 81/2038 493/213 |
| 2006/0076058 A1* | 4/2006 | Rypstra ................ B65D 77/225 137/246 |
| 2006/0245933 A1 | 11/2006 | Balch et al. |
| 2009/0190861 A1 | 7/2009 | Turvey et al. |
| 2012/0243807 A1 | 9/2012 | Pascoe |
| 2012/0281933 A1 | 11/2012 | Beer et al. |
| 2014/0205213 A1 | 7/2014 | Beer |
| 2015/0102030 A1* | 4/2015 | Gardner .................. F16K 13/10 137/511 |
| 2015/0232241 A1 | 8/2015 | Gardner et al. |
| 2016/0340085 A1 | 11/2016 | Pettis et al. |
| 2017/0001783 A1 | 1/2017 | Binda |
| 2017/0028316 A1 | 10/2017 | Branyon |
| 2017/0283136 A1* | 10/2017 | Branyon .................. B32B 3/266 |
| 2017/0307091 A1* | 10/2017 | Branyon .............. B65D 77/225 |

\* cited by examiner

FLEXIBLE LAMINATE STRUCTURE WITH INTEGRATED ONE-WAY VALVE

CROSS-REFERENCE TO RELATED APPLICATIONS

This application claims priority to U.S. Non-Provisional patent application Ser. No. 16/446,904, filed Jun. 20, 2019, entitled "FLEXIBLE LAMINATE STRUCTURE WITH INTEGRATED ONE-WAY VALVE", wherein the foregoing is incorporated by reference in its entirety herein.

FIELD OF THE INVENTION

This invention relates generally to one-way valves that are integral to a flexible laminate structure and that are configured to allow gas to vent from within the package.

BACKGROUND

Packages can be used to store various types of products. In some cases, for example, a flexible laminate structure can be used to form a package, such as a bag or a pouch, for holding a product that may, over time, generate gas (e.g., outgas). For example, freshly roasted coffee may have a tendency to off-gas carbon dioxide. Other products may also undergo a reaction over time within the package that results in the generation of gas. The products stored within the package may need to be protected from the ingress of oxygen and/or moisture to promote freshness and shelf-life and to maintain the quality of the contents for as long as possible, but also allow off-gassing of generated gasses.

SUMMARY OF THE INVENTION

Embodiments of the invention described herein provide improved packages for storing products and associated methods for forming such packages, where the packages are designed to allow gas generated within the package to escape to the external environment (e.g., to minimize or prevent ballooning or other distortions of the package that may be caused by increasing gas pressure within the package) while at the same time minimizing the amount of oxygen and/or moisture that is allowed to enter the package.

In some embodiments, for example, a flexible laminate structure for a package is provided that includes an integrated one-way valve feature. The flexible laminate structure comprises a first film layer and a second film layer laminated to the first film layer. The first film layer includes a first cut line and the second film layer includes a second cut line offset from the first cut line. A valve area is defined in the laminate, where the valve area includes the first and second cut lines. In addition, the valve area comprises a viscous medium, such as oil, that is pattern-applied to at least one of the first or second film layers and is disposed between the first and second film layers so as to occupy at least a portion of the valve area.

In an embodiment, the valve area is generally adhesive-free in the areas which contain the viscous medium, but comprises one or more adhesive zones which create specific de-gassing flow channels between the first and second cut lines. The present invention provides one-way valves which are customizable. For example, the required opening pressure of a valve can be altered based upon the amount and disposition of the adhesive used and the size of the flow channels created.

Further, one-way valves which are adhesive-free within the valve area result in an unsupported valve portion of the bag/pouch structure, allowing the valve to open too easily, and resulting in an unwanted ingress of oxygen. Use of adhesive within the valve area, as is disclosed herein, reinforces the structure of the valve closure and better maintains the valve in a closed position. The resulting valve is reinforced in the closed position and provides a reduction in oxygen ingress.

In an embodiment, the invention comprises a one-way valve for a flexible package comprising a first film layer which comprises at least one first cut line and a second film layer which comprises at least one second cut line, wherein the at least one second cut line is offset from the at least one first cut line. An adhesive layer is disposed between the first and second film layer, wherein the first film layer, the second film layer, and the adhesive layer define a valve area in which the first film layer and the second film layer are not permanently adhered to each other. The at least one second cut line fluidly connects an interior of the flexible package to the valve area and the at least one first cut line fluidly connects the valve area to an ambient atmosphere surrounding the flexible package. An adhesive pattern is disposed within the valve area and creates a gas flow channel from the second cut line toward the first cut line. An oil occupies the portions of the valve area which are not adhered via the permanent adhesive.

In an aspect, at least one first cut line comprises a plurality of arc-shaped cut lines arranged in a semi-circular pattern. In another aspect, the at least one second cut line comprises a plurality of straight lines. In still another aspect, the plurality of straight lines are disposed vertically beneath the semicircle of the first cut line. In an aspect, the plurality of straight lines are vertical.

In some embodiments, the adhesive pattern comprises two patches of adhesive. The adhesive patches may extend into the valve area horizontally, from opposite sides of the valve area and create the gas flow channel between them. The adhesive patches may be continuous with the adhesive layer defining the valve area. The adhesive patches may comprise a first side and a second side, wherein the side which is closest to the second cut line is angled to direct gas flow toward the first cut line.

In an embodiment, the adhesive patches may each comprise an elongated semi-ovular shape with a first elongated side and a second elongated side, wherein the elongated side which is closest to the second cut line is angled upwardly, wherein the upward angle is defined starting from an edge of the second elongated side at a perimeter of the valve area and moving toward an end of the adhesive area nearest the channel. In an embodiment, the distance between a vertical midpoint of the valve area and the edge of the second elongated side is approximately twice or exactly twice the distance between the vertical midpoint of the valve area and the first elongated side. In an embodiment, the upward angle may be between about 15° and 30°, with reference to the horizontal centerline of the valve area. In an embodiment, the upward angle may be about 20°, with reference to the horizontal centerline of the valve area.

The adhesive patches may be disposed at least partially horizontally outwardly of the first and second cut lines and between the vertical disposition of the first and second cut lines. The channel, in an embodiment, may be between about ¼ inch and ½ inch, in the dimension between the patches of adhesive. Alternatively, the channel may be about ⅜ inch, in the dimension between the patches of adhesive.

In an embodiment, the first film comprises the exterior layer of the package and the second film comprises the interior film of the package. In an embodiment, the adhesive pattern comprises one patch of adhesive which is surrounded, within the valve area, with an adhesive-free region. The patch of adhesive may be disposed such that the gas flow channel extends around one or both sides of the patch of adhesive. The valve area may have a closed shape in some embodiments.

The invention also comprises a method for manufacturing a one-way valve for a flexible package, the method comprising providing a first film layer, providing a second film layer, and pattern applying a permanent adhesive to one of the first or second film layer to adhere the layers, define a valve area by avoiding applying the adhesive to the valve area, and define at least one adhesive patch located within the valve area, wherein the at least one adhesive patch creates a gas flow channel. The method involves laminating the first film layer to the second film layer using the adhesive, cutting at least one first cut line in the first film layer, within the valve area, and cutting at least one second cut line in the second film layer, within the valve area. The at least one second cut line is offset from the at least one first cut line and wherein the gas flow channel is disposed between the first and second cut lines. An oil is applied to the adhesive-free portions of the valve area, between the first and second film layers. The laminated film is formed into a package wherein the at least one second cut line fluidly connects an interior of the flexible package to the valve area and the at least one first cut line fluidly connects the valve area to an ambient atmosphere surrounding the flexible package.

The invention comprises another method for manufacturing a flexible package having a one-way valve, the method comprising providing a first film layer, providing a second film layer, determining a required opening pressure for the valve, and pattern applying a permanent adhesive to one of the first or second film layer to adhere the layers, define a valve area by avoiding applying the adhesive to the valve area, and define two adhesive patches located within the valve area, wherein the adhesive patches create a gas flow channel between them, wherein the size and configuration of the adhesive patches is selected based upon the desired opening pressure for the valve. The first film layer is laminated to the second film layer using the adhesive and at least one first cut line is cut in the first film layer, within the valve area. At least one second cut line is cut in the second film layer, within the valve area, wherein the at least one second cut line is offset from the at least one first cut line. The gas flow channel is disposed between the first and second cut lines. An oil is applied to the adhesive-free portions of the valve area, between the first and second film layers. The laminated film is formed into a package wherein the at least one second cut line fluidly connects an interior of the flexible package to the valve area and the at least one first cut line fluidly connects the valve area to an ambient atmosphere surrounding the flexible package.

In an embodiment, the method is adjustable such that a greater volume of adhesive is pattern applied as the adhesive patches if a higher opening pressure is desired. Likewise, the method is adjustable such that a lesser volume of adhesive is pattern applied as the adhesive patches if a lower opening pressure is desired. In an embodiment, if the desired opening pressure is between about 0.2 and 0.5 PSI, the adhesive patches are configured to create a channel with a width of about ½ inch, as measured between the adhesive patches. In an embodiment, if the desired opening pressure is between about 1.0 and 1.5 PSI, the adhesive patches are configured to create a channel with a width of about ¼ inch, as measured between the adhesive patches. In another embodiment, if the desired opening pressure is between about 0.5 and 1.0 PSI, the adhesive patches are configured to create a channel with a width of about ⅜ inch, as measured between the adhesive patches.

BRIEF DESCRIPTION OF THE DRAWINGS

Figure 1:
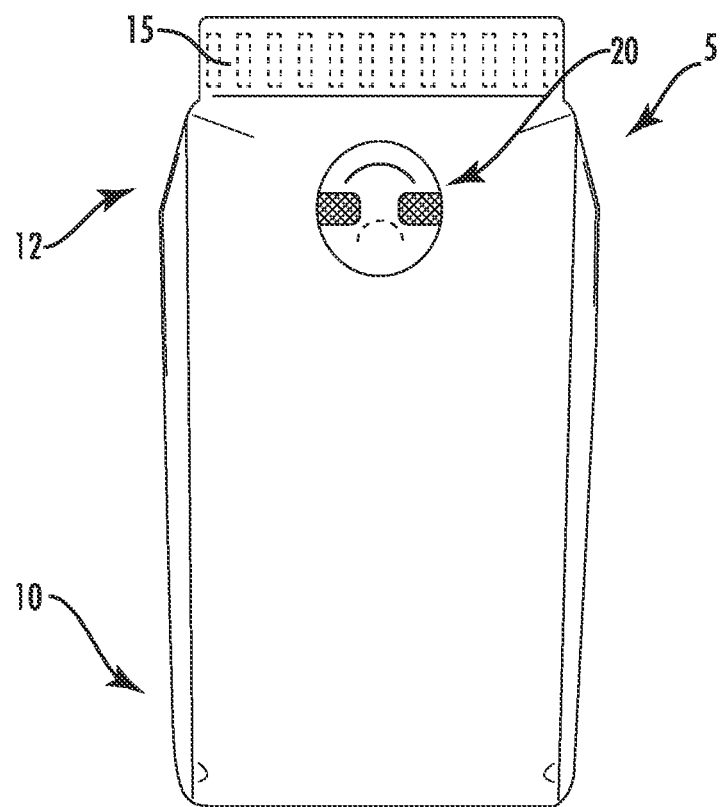
Figure 2A:
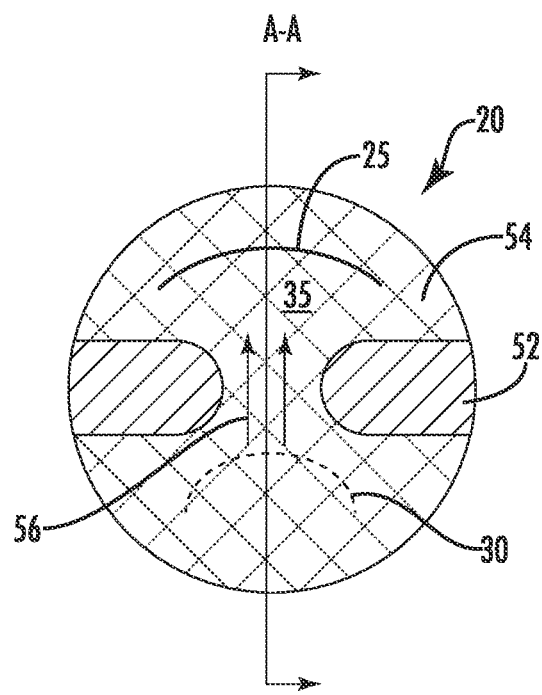
Figure 2B:
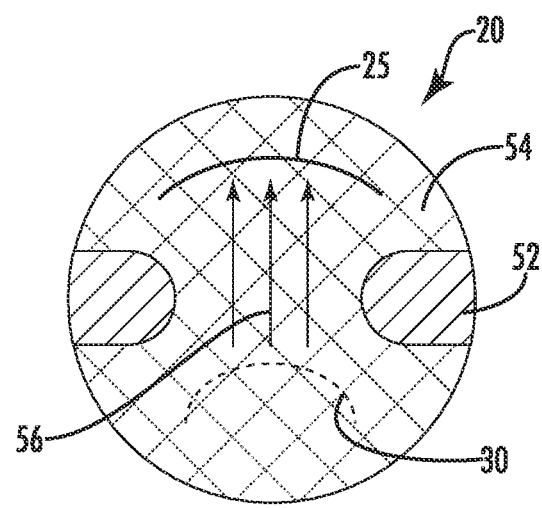
Figure 3A:
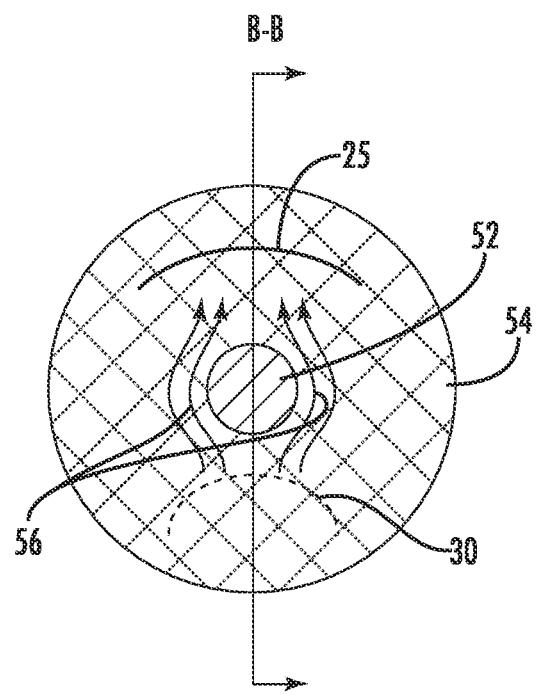
Figure 3B:
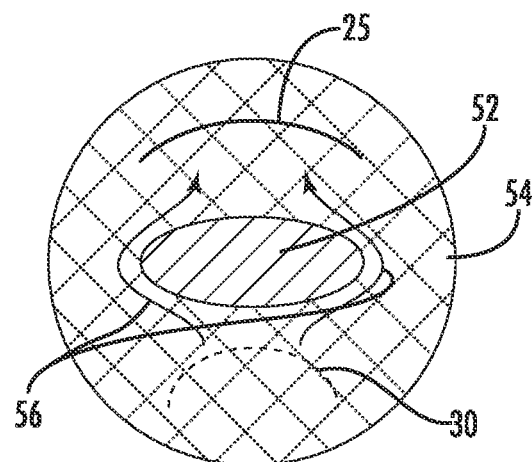
Figure 4A:
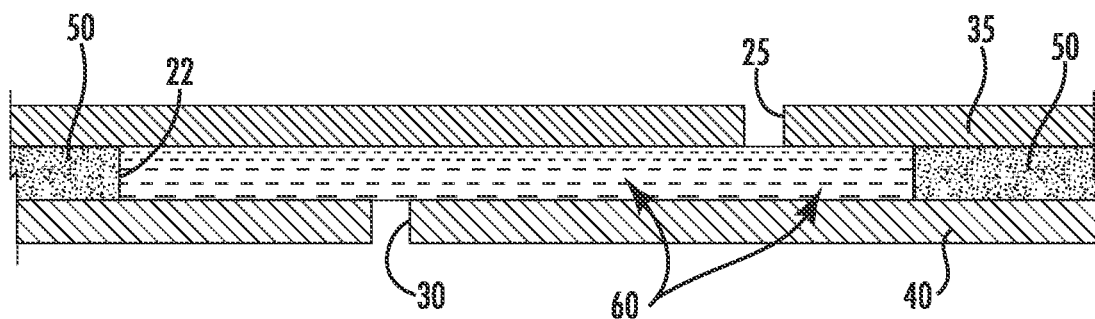
Figure 4B:
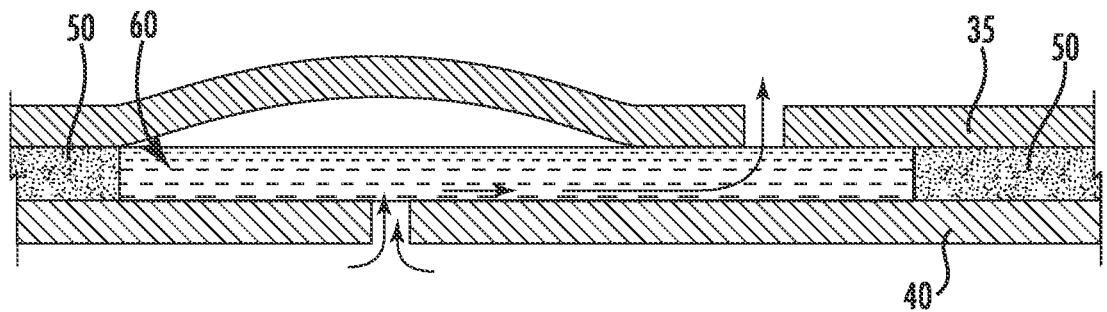
Figure 5:
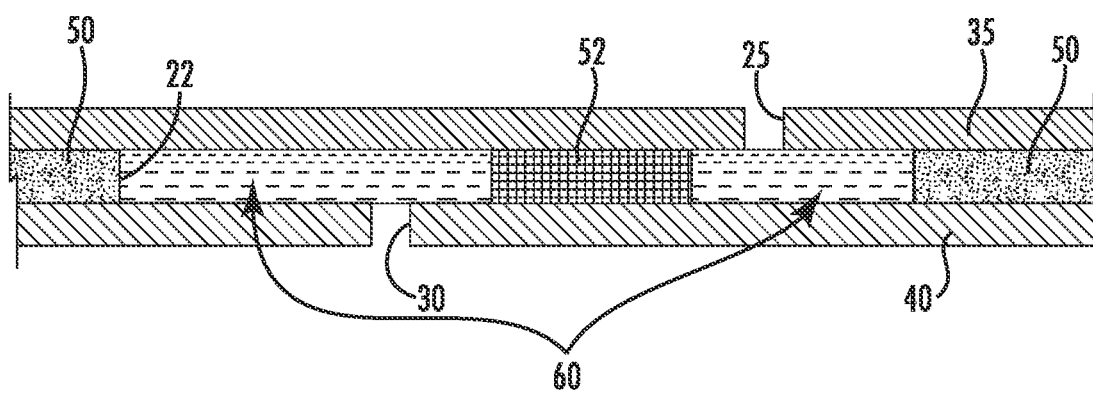

Having thus described the disclosure in general terms, reference will now be made to the accompanying drawings, which are not necessarily drawn to scale, and wherein:

FIG. 1 is a perspective view of a package having an integrated valve according to an example embodiment;

FIG. 2A is a close-up view of the integrated valve of the package of FIG. 1 according to an example embodiment;

FIG. 2B is a close-up view of an alternative embodiment of an integrated valve of the package according to an example embodiment;

FIG. 3A is a close-up view of an alternative embodiment of an integrated valve of the package according to an example embodiment;

FIG. 3B is a close-up view of an alternative embodiment of an integrated valve of the package according to an example embodiment;

FIG. 4A is a schematic cross-sectional view of a flexible laminate structure with an integrated valve in a closed configuration according to an example embodiment;

FIG. 4B is a schematic cross-sectional view of the flexible laminate structure of FIG. 3 with the integrated valve in an open configuration according to an example embodiment;

FIG. 5 is a schematic cross-sectional view of an alternative flexible laminate structure with an integrated valve in a closed configuration according to an example embodiment.

Figure 6A:
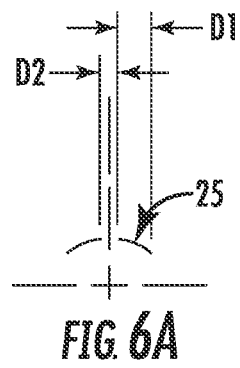
Figure 6B:
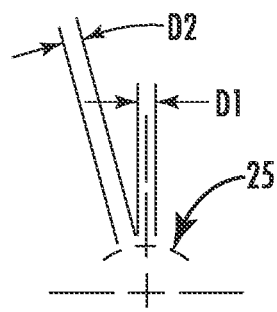
Figure 6C:
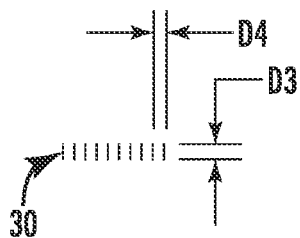
Figure 6D:
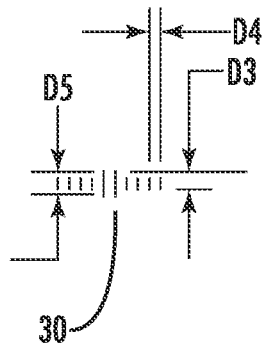
Figure 7:
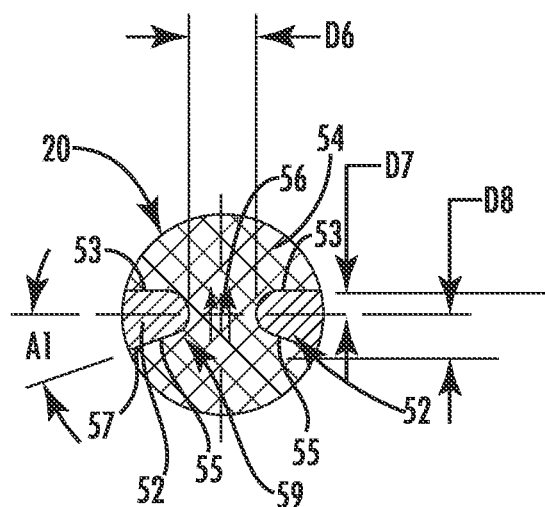
Figure 8A:
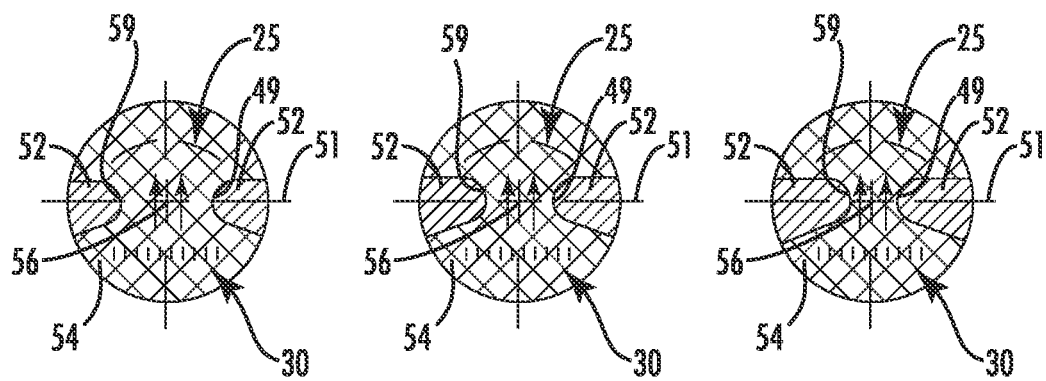
Figure 8B:
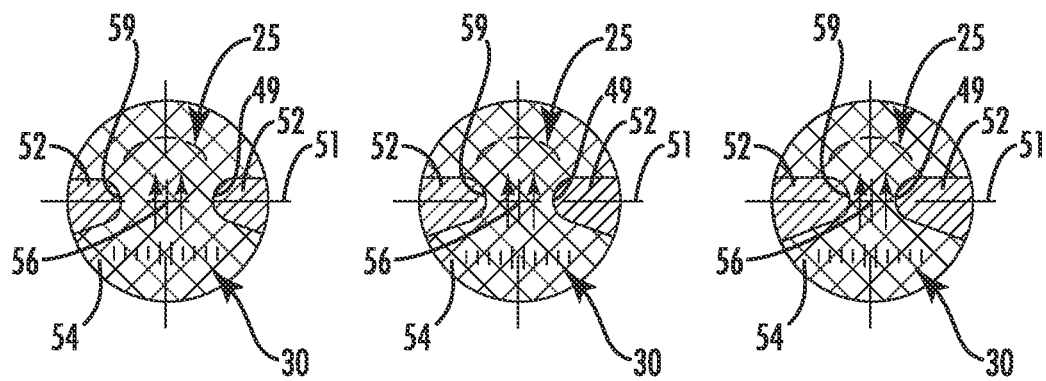
Figure 9A:
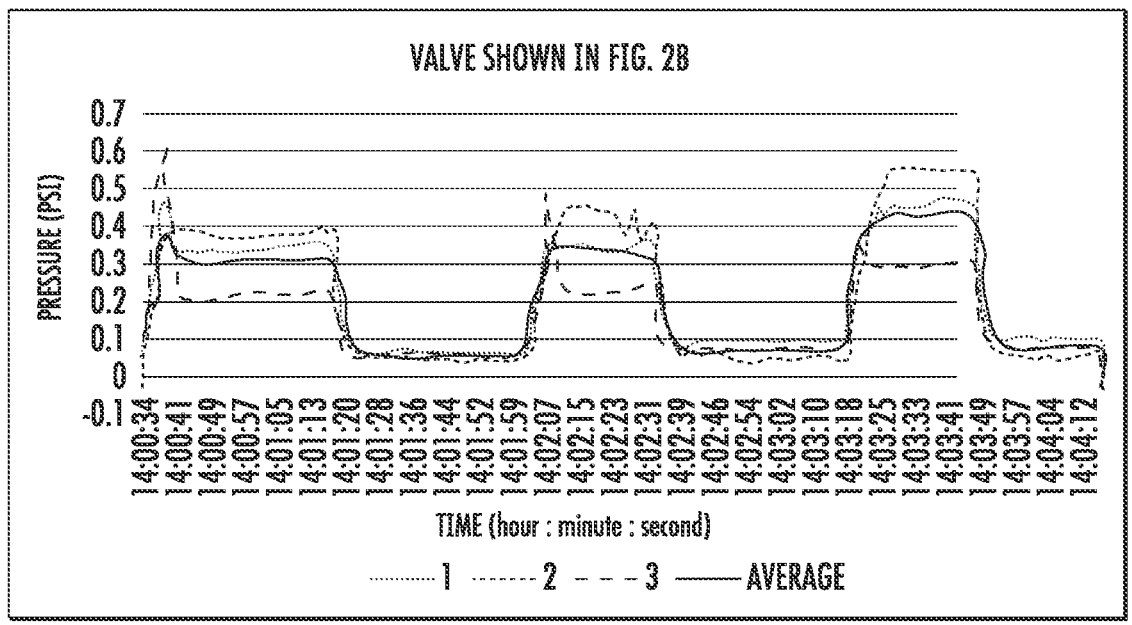
Figure 9B:
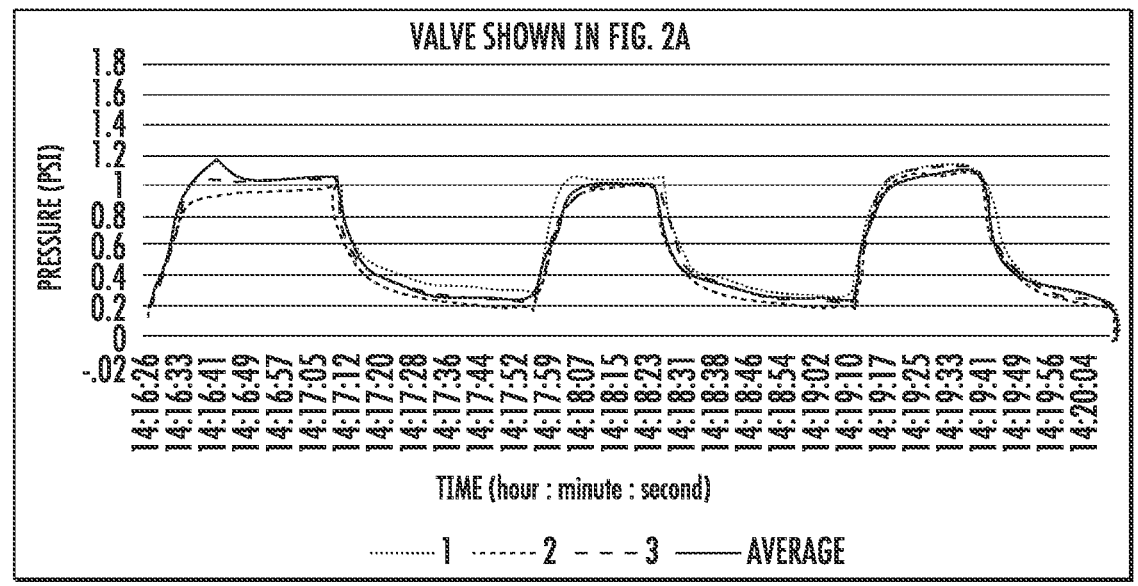

FIGS. 6A-6B are close-up views of alternative embodiments of a top/external cut line in an integrated valve of the package according to an example embodiment;

FIGS. 6C-6D are close-up views of alternative embodiments of a bottom/internal cut line in an integrated valve of the package according to an example embodiment;

FIG. 7 is a close-up views of an alternative embodiment of adhesive regions in an integrated valve of the package according to an example embodiment;

FIGS. 8A and 8B are close-up views of alternative embodiments of an integrated valve of the package according to an example embodiment; and FIGS. 9A and 9B are graphs illustrating the opening and closing pressures required to open and close inventive valves.

DETAILED DESCRIPTION OF THE INVENTION

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Packages can be used to hold a variety of products, including food products and other products that may undergo a reaction over time that generates gas. As an example, fresh roasted coffee has a tendency to outgas (generate carbon dioxide). Other products may release gas over time, as the product ages or is exposed to even minimal levels of oxygen or moisture as may enter the sealed package.

When such products are stored in a sealed container, there is a danger that the gas produced inside the package will build up. As a result, the package can become inflated and bulge outwardly, which may be unsightly and/or deter a customer from purchasing the package. Furthermore, as more and more gas accumulates within the package, the pressure inside the package may rise to the level of bursting the package or affecting one or more of the seals of the package (e.g., before a consumer wishes to open the package).

At the same time, maintaining a good seal on the package is important to protect the contents of the package from the external environment, such as to prevent the ingress of atmospheric gas (e.g., oxygen and water vapor). The goals of allowing gas to escape from the package while at the same time also preventing the unwanted ingress of gas/water vapor into the package are, thus, seemingly diametrically opposed.

Conventional solutions include one-way valves that are adhesive free within the valve area. Such solutions, however, result in a region of the package (i.e. the valve region) that is structurally unsupported due to the lack of adhesive. The valve area may flex and bend more than the remainder of the packaging due to the lack of support and, as a result, the valve may open and allow an unwanted ingress of oxygen. Further, the opening pressure of conventional one-way valves which are adhesive-free in the valve region cannot be adjusted.

Accordingly, embodiments of the present invention provide a flexible laminate structure for a package that includes an integrated one-way valve feature configured to allow gas generated within the package (e.g., carbon dioxide outgas) to be released to the external environment, while at the same time maintaining the integrity of the package contents by preventing environmental elements from entering the package. Because the valve contains at least one region of adhesive, it is structurally more secure and is more likely to dispose the valve in the closed position. In addition, the opening pressure of the inventive valve can be customized based upon the container contents, need for venting, etc.

With reference to FIG. 1, for example, a package 5 (e.g., a gusseted bag, pouch, or other flexible package) is shown that is designed to hold a product that is prone to off-gassing, such as freshly roasted coffee. The package 5 may have a first end 10, upon which the package might rest when placed on a surface, and a second end 12 opposite the first end. In some cases, the product contained within the package 5 may only occupy a portion of the volume of the package, such that part of the inner volume of the package closest to the second end 12 may be empty. The first end 10 of the package 5 may be gusseted to accommodate a greater volume of product within the package and/or to provide a more stable base on which the package can rest. The second end 12 of the package 5 may, in some cases, include a seal 15, such as a heat seal that is applied to maintain the package contents inside the package and prevent atmospheric gas from entering the package prior to opening of the package.

In some embodiments, the flexible laminate that forms the package 5 defines a valve area 20, sometimes referred to as a valve chamber. For example, the valve area 20 may be disposed proximate the second end 12 of the package 5, such as in the empty region of the package. In this way, the risk that the package contents will interfere with the operation of the valve 20 can be minimized.

FIG. 2A shows a close-up view of an embodiment of the valve area 20 of the package 5. The valve area 20 may, in this regard, be defined to include a first cut line 25 defined in a first film layer 35 of the laminate and a second cut line 30 defined in a second film layer 40 of the laminate. In some embodiments, the cut line 30 may comprise an inlet for gas from the interior of the packaging into the valve area 20 and the cut line 25 may comprise an outlet for gas from the interior of the valve area 20 out to the external atmosphere. In the view shown in FIG. 2A, for example, the first film layer 35 forms the outer layer of the flexible laminate forming the package 5, whereas the second film layer 40 forms an inner layer of the flexible laminate and is thus underneath the first film layer.

Accordingly, the flexible laminate structure may comprise a first film layer 35 and a second film layer 40. The second film layer 40 may be laminated to the first film layer via an adhesive 50 (shown in FIGS. 4A and 4B) that is pattern-applied to at least one of the first or second film layers. The adhesive 50 may define a boundary around the valve area 20, between the first film layer 35 and second film layer 40.

The first film layer 35 may include the first cut line 25, and the second film layer 40 may include the second cut line 30, which is offset from the first cut line 25 (e.g., is spaced apart from the first cut line).

The adhesive layer 50 may define the boundary of the valve area 20, but may also extend at least partially into the valve area 20 via adhesive portion(s) 52. Adhesive layer 50 and adhesive portion(s) 52 of the valve area 20 (discussed below) may comprise any adhesive known in the art. In an embodiment, the adhesives may be permanent, pressure sensitive, strong, weak, or any other adhesive known to adhere laminated layers. In an embodiment, the adhesive is a permanent adhesive.

In a particular embodiment, the first and/or second cut lines 25, 30 are curved. In an embodiment, the first and/or second cut lines 25, 30 may be curved in the same manner—i.e. they may each be convex or they may each be concave. In a particular embodiment, both cut lines 25, 30 are convex.

In another embodiment, both cut lines 25, 30 are curved, but in opposite manners. In this embodiment, one of the cut lines may be convex and the other cut line may be concave. In an embodiment, the cut lines 25, 30 are generally aligned vertically or horizontally, within the valve area. In an embodiment, the second cut line 30 is disposed vertically beneath the first cut line 25, in relation to the typical sitting position of the container. That is, if the container is a flexible pouch or bag that typically sits or is designed to sit vertically upright, the terms vertical and horizontal, as used herein are used in relation to that designed positioning of the container.

In an embodiment, the radius of curvature of one of the cut lines is different from and/or is greater than that of the other cut line. In some embodiments, the first cut line 25 is disposed inwardly from the perimeter of the valve area and mimics the curvature of the perimeter of the valve area. In this embodiment, the valve area 20 may be generally circular or ovular in nature. Any shape, however, is possible for the valve area 20. For example, the valve area 20 may be square, rectangular, triangular, elongated, or may have an entirely irregular shape. In an embodiment, the valve area 20 has a closed shape.

In an embodiment, shown in FIGS. 6A-B, for example, one or both of the cut lines 25, 30 may be interrupted cut lines. In FIG. 6A, the cut line 25 may comprise two, three, or more interrupted curved or arched lines. That is, each individual line which makes up the cut line 25 may be curved or may be shaped as an arc. The plurality of arc-shaped lines may comprise a half-circular or semi-circular pattern which is, in effect, the cut line 25. The length D1 of each portion of interrupted cut line 25 may be between about 0.1 and 0.3 inches. In a particular embodiment, the length D1 of each portion of interrupted cut line 25 may be between about 0.13 and 0.25 inches. In an embodiment, the length of each portion of interrupted cut line 25 may be equivalent to the distance between the various interrupted portions of cut line 25. The distance D2 between the various interrupted portions of cut line 25 may be, in an embodiment, between about 0.1 and 0.2 inches. In a particular embodiment, the distance D2 between the various interrupted portions of cut line 25 may be between about 0.125 and 0.135 inches.

In a specific embodiment, the radius of curvature of the second cut line 30 is greater than that of the first cut line 25. In this way, the second cut line 30 may direct any gas formed within the package more efficiently toward the first cut line 25. In this embodiment, the curvature of the second cut line 30 may point toward the first cut line 25. Any configuration known in the art for the cut lines 25, 30 may be utilized. For example, the cut lines 25, 30 may be straight lines, waves, angled lines, bent lines, v-shaped, u-shaped, or any other shape known in the art.

In an embodiment, the cut line 30 may comprise two, three, or more interrupted curved or arched lines. That is, each individual line which makes up the cut line 30 may be curved or may be shaped as an arc. The plurality of arc-shaped lines may comprise a half-circular pattern which is, in effect, the cut line 30. The number of cut lines which comprise the cut line 30 may be different or the same as the number of cut lines which comprise the cut line 25.

In an embodiment, the cut lines 30 may be different in shape from the cut lines 25. For example, FIGS. 6C and 6D illustrate alternative embodiments of cut lines 30. In this embodiment, cut line 30 comprises multiple vertical cut lines. Any number of cut lines 30 may be utilized. In an embodiment, between two and twenty cut lines 30 are utilized. In a particular embodiment ten cut lines 30 are utilized.

In an embodiment, the plurality of cut lines 30 are disposed such that lengthwise, they extend toward the cut line(s) 25. That is, a first end or a second end of the plurality of cut lines 30 extends toward cut line 25, so as to direct flow of gas toward cut line 25.

In an embodiment (shown in FIG. 6C), cut lines 30 are vertical, equally spaced from one another and equal in length. In another embodiment, cut lines 30 are vertical, equally spaced from one another, but the lines nearest the horizontal midpoint of the lines are longer in length than the other lines. For example, FIG. 6D illustrates cut lines 30 as vertical, equally spaced from one another, but the two lines nearest the horizontal midpoint of the entirety of the cut lines 30 are longer in length than the other lines.

The length D3 of each portion of cut line 30 may be between about 0.5 and 0.75 inches. In a particular embodiment, the length D3 of each portion of interrupted cut line 30 may be between about 0.55 and 0.65 inches. In an embodiment, the length of each portion of interrupted cut line 30 may be equivalent to the distance between the various interrupted portions of cut line 30. The distance D4 between the various interrupted portions of cut line 30 may be, in an embodiment, between about 0.5 and 0.75 inches. In a particular embodiment, the distance D2 between the various interrupted portions of cut line 30 may be between about 0.55 and 0.65 inches.

In the embodiment shown in FIG. 6D, the length D5 of the longer cut lines 30 may be between about 0.1 and 0.15 inches. In a particular embodiment, the length D5 of the longer cut lines 30 may be between about 0.12 and 0.13 inches. In an embodiment, the longer cut lines 30 may be twice the length or about twice the length of the shorter cut lines 30. In an embodiment, the longer cut lines 30 may be vertically centered within the shorter cut lines 30. That is, there may be equal lengths of the longer cut lines 30 above and below the length of the shorter cut lines 30.

Within the valve area 20, at least one region of adhesive 52 and at least one adhesive-free region 54 is present. The examples shown in FIGS. 2A and 2B illustrate two regions of adhesive 52 with the surrounding region of the valve area 20 being adhesive-free 54. The examples shown in FIGS. 3A and 3B each illustrate one region of adhesive 52 with the surrounding region being adhesive-free 54.

In the embodiments shown in FIGS. 2A and 2B, two areas of adhesive 52 are shown. The adhesive areas 52 may be symmetrical, in an embodiment. In an embodiment, one adhesive region 52 is disposed on the left side and one adhesive region 52 is disposed on the right side of the valve area. In an embodiment, the adhesive regions 52 may be continuous with the adhesive layer 50 which adheres the first film layer 35 and the second film layer 40.

In an embodiment, the adhesive areas 52 are disposed such that a channel 56 is created between at least two adhesive areas 52, wherein the channel allows the flow of gasses between the cut lines 25 and 30. Thus, in this embodiment, the channel 56 may be disposed between at least two adhesive areas 52 and between the two cut lines 25, 30. In an embodiment, the channel 56 is centered between at least two adhesive areas 52 and between the two cut lines 25, 30. The adhesive areas 52 may extend into the valve area 20 horizontally, from opposite sides of the valve area 20 and create the gas flow channel 56 between them.

In an embodiment, the width D6 of the channel 56, between the adhesive areas 52, may be between about ¼ inch and about ½ inch in a dimension, such as width. In an embodiment, the width D6 of the channel 56, between the adhesive areas 52, may be approximately ⅜ inch.

In an embodiment, the adhesive regions 52 are located generally between the cut lines 25, 30. This may comprise adhesive regions 52 being vertically centered or horizontally centered between the cut lines 25, 30. In some embodiments, the adhesive region 52 may be both vertically and horizontally centered between the cut lines 25, 30. In other embodiments, the adhesive regions 52 may be disposed at least partially horizontally outwardly of the cut lines 25, 30 but between the vertical disposition of the cut lines 25, 30.

In an embodiment, the adhesive areas 52 are semi-circular, semi-ovular, or semi-elliptical. In an embodiment, the adhesive areas 52 may be elongated semi-circles, semi-ovals, or semi-ellipses. In this embodiment, the curvature of the semi-circle, semi-oval, or semi-ellipse may aid in forcing any gasses to move from cut line 30, through the channel 56, and to cut line 25.

In a particular embodiment (shown in FIG. 7), the adhesive areas 52 may be angular on one or more sides. For example, the adhesive areas 52 may be shaped generally as an elongated semi-oval, but may have a first elongated side 53 which is disposed parallel to the horizontal centerline of the valve 20. The second elongated side 55 of the adhesive area 52 may be disposed at an angle A1 as compared to the horizontal centerline of the valve 20. In an embodiment, the angle A1 may be between about 10° and 45°, as compared to the horizontal centerline of the valve 20. In another embodiment, the angle A1 may be between about 15° and 30°, as compared to the horizontal centerline of the valve 20. In a particular embodiment, the angle A1 may be about 20°, as compared to the horizontal centerline 51 of the valve 20 or absolute horizontal.

In an embodiment, the angle A1 of the second side 55 may direct gasses from cut line 30 and toward cut line 25. That is, the angle A1 of the second side 55 may be a downward angle, starting from the middle (vertical and horizontal) of the valve area 20 toward the edge 57 of the second side 55. The angle A1 of the second side 55 may be an upward angle, starting from the edge 57 of the second side 55 (where the adhesive area 52 meets the remainder of the adhesive layer 50; at or near the perimeter of the valve area 20) and moving toward the end 59 of the adhesive area 52 nearest the centerline 51 of the valve 20. In an embodiment, each of two adhesive areas 52 comprise an elongated semi-ovular shape with a first elongated side 53 and a second elongated side 55 and wherein the elongated side which is closest to the second cut line 30 is angled upwardly, wherein the upward angle is defined starting from the edge 57 of the second elongated side 55 at the perimeter of the valve area 20 and moving toward the end 59 of the adhesive area 52 nearest the horizontal center of the valve area 20 or the channel 56.

The edge 57 of the adhesive area 52 nearest cut line 30 may be further from the centerline 51 of the valve 20 (horizontal or vertical, as the case may be) than is the end 59 of the adhesive area 52 nearest channel 56.

In an embodiment, the distance D8 between the centerline 51 of the valve 20 and the edge 57 of the adhesive area 52 nearest cut line 30 may be approximately twice or exactly twice the distance D7 between the centerline 51 of the valve 20 and the first side 53 of the adhesive area 52. For example, the distance D8 between the centerline 51 of the valve 20 and the edge 57 of the adhesive area 52 nearest cut line 30 may be approximately 0.240 inches and the distance D7 between the centerline 51 of the valve 20 and the first side 53 of the adhesive area 52 may be approximately 0.125 inches. In another embodiment, the distance D8 between the vertical midpoint of the valve area 20 and the edge 57 of the adhesive area 52 along the perimeter of the valve area 20 and nearest cut line 30 may be approximately twice or exactly twice the distance D7 between the vertical midpoint of the valve area 20 and the first side 53 of the adhesive area 52.

It should be understood that the adhesive areas 52 should not be limited to the shapes discussed herein and can take any shape known in the art, such as triangles, squares, rectangles, or irregular shapes.

FIGS. 8A and 8B illustrate various examples of cut lines 25, 30 options and adhesive areas 52 of differing dimensions, providing channels 56 of varying sizes and width. For example, the cut lines 25 shown in FIG. 8A each comprise two curved interrupted portions. The cut lines 25 in FIG. 8B comprise three curved interrupted portions. The cut lines 30 in FIG. 8A shown ten equally sized and dimensioned vertical cut lines. The cut lines 30 in FIG. 8A shown ten vertical cut lines, each the same distance from one another, but the two vertical lines 30 in the center being longer than the other lines. The adhesive areas 52 are shown as having various distances from each other, creating channels 56 of varying distances. It should be understood that these various cut lines, adhesive areas, channels, and other features may be combined in any manner known in the art and need not be combined in these particular manners.

As noted, a gas passage channel 56 may be disposed through the center of the valve 20, between the cut lines 25, 30. In an embodiment, the only way in which gasses may escape the package is to travel from cut line 30, through the channel 56, to cut line 25. In this embodiment, the size of the channel may be altered based upon the size and disposition of the adhesive areas. For example, if the adhesive areas 52 are larger, the channel 56 is smaller and it becomes more difficult for gasses to pass through the channel 56. Accordingly, a higher opening pressure is required to allow the valve to open and gas to pass therethrough.

Likewise, if the adhesive areas 52 are not necessarily larger but are disposed more closely together (i.e. closer to the center of the valve area 20), the channel 56 is smaller and it becomes more difficult for gasses to pass through the channel 56. Accordingly, a higher opening pressure is required to allow the valve to open and gas to pass therethrough.

If, however, the adhesive areas 52 are smaller or have a greater separation between them, the channel 56 is larger and it becomes easier for gasses to pass through the channel 56. Accordingly, a lower opening pressure is required to allow the valve to open and gas to pass therethrough.

In an embodiment, if the desired opening pressure is between about 0.2 and 0.5 PSI, two adhesive patches may be configured to create a channel between them with a width of about ½ inch, as measured between the adhesive patches. If the desired opening pressure is between about 1.0 and 1.5 PSI, the adhesive patches may be configured to create a channel with a width of about ¼ inch, as measured between the adhesive patches. If the desired opening pressure is between about 0.5 and 1.0 PSI, the adhesive patches may be configured to create a channel with a width of about ⅜ inch, as measured between the adhesive patches. It should be understood that if opening pressures above or below those recited are desired, the adhesive patch(es) may be adjusted to provide larger or smaller channels. In an embodiment, a greater or lesser volume of adhesive may be applied to the first or second film layer to accomplish the variable adhesive patch sizes.

In an embodiment, the adhesive areas 52 do not extend to the center of the valve area 20. In an embodiment, the adhesive areas 52 are symmetrical. In other embodiments, the adhesive areas 52 may be asymmetrical. In an embodiment, the channel 56 between cut lines 25 and 30 is a straight line.

In some embodiments (shown in FIGS. 3A and 3B), the adhesive 52 is discontinuous from the adhesive layer 50 which otherwise adheres the first film layer 35 and the second film layer 40. That is, the valve area 20 may be adhesive free 54 in all areas surrounding a patch of adhesive 52. In an embodiment, the adhesive 52 may comprise a circle, oval, or ellipse. Likewise, however, the adhesive 52 may comprise any shape known in the art, such as a triangular shape, square shape, diamond shape, arrow shape, elongated angled arms, or the like.

In this embodiment, one or more channels 56 are created around one or more sides of the adhesive 52. When gas passes through cut line 30, it is forced around the adhesive 52 patch before it can exit the valve at cut line 25. A smaller patch of adhesive 52 will allow an easier escape of gas and a lower opening pressure requirement, whereas a larger patch of adhesive 52 will require a greater opening force in order for the valve to open because the gas is forced around a larger patch of adhesive. Thus, varying the size of the adhesive 52 will allow the user to adjust the required opening force for the valve 20.

In some embodiments, the region of adhesive 52 may be disposed directly between the location of the cut lines 25, 30. In this embodiment, the adhesive 52 may block what would otherwise be a direct path (i.e. straight line) between the cut line 30 and the cut line 25. In this embodiment, gases are forced through the channel(s) 56 as an alternative to the direct route between the cut lines.

In some embodiments, the adhesive patch 52 may be symmetrical. In other embodiments, the adhesive patch 52 may be asymmetrical. In some embodiments, the adhesive patch 52 may be smaller than, substantially similar in size to, or larger than the cut lines 25 or 30. In an embodiment, the adhesive patch 52 may be generally disposed in the center of the valve area 20. In an embodiment, the adhesive patch 52 may extend outwardly from the center of the valve area 20, to be at least coextensive with the length of the cut line 25 or the cut line 30. In an embodiment, the adhesive patch 52 may extend outwardly from the center of the valve area 20, such that it is longer than the cut line 25 or the cut line 30. In an embodiment, the adhesive patch 52 may extend outwardly from the center of the valve area 20, and is smaller than length of the cut line 25 or the cut line 30.

In other embodiments, the adhesive patch 52 may not be centered within the valve area 20 and/or between the cut lines 25, 30. In this embodiment, the adhesive patch 52 may be offset from the center of the valve area 20 such that escaping gasses must pass around just one side of the adhesive patch 52. In still another embodiment, escaping gasses may pass around both sides of the adhesive patch 52, but the patch 52 may be designed to force the gasses more dominantly around one side or the other. For example, an offset ovular patch may allow gasses to pass around both of its sides, but due to the offset nature, may favor gasses passing on primarily one side.

A cross-section of an exemplary valve area 20, as taken along line A-A of FIG. 2A, is shown in FIG. 4A in a closed position and in FIG. 4B in an open position. With reference to FIGS. 4A and 4B, the valve area 20 includes the first and second cut lines 25, 30, such that the first and second cut lines are contained within a perimeter of the valve area 20.

The valve area 20 may be an area of the flexible laminate that is devoid of adhesive 50 adhering the first and second film layers 35, 40 to each other but for the adhesive zone 52. In this way, the perimeter of the valve area 20 may be the interface between an area including adhesive 50 and an area devoid of permanent adhesive but for the adhesive zone(s) 52.

The valve area 20 may comprise a viscous medium, such as oil 60, that is pattern-applied to at least one of the first or second film layers 35, 40 and is disposed between the first and second film layers so as to occupy at least a portion of the valve area 20. The oil 60 may, for example, be silicone oil in some cases. The oil 60 may likewise be hydrocarbon oil, glycerin, polyhydric alcohol (polyol), water or other appropriate lubricant that may temporarily yield when a predetermined opening pressure differential exists between the interior pressure and the ambient pressure surrounding the flexible package.

The presence of the oil 60 may encourage the opposing surfaces of the first and second film layers 35, 40 (e.g., the surface of each film layer that is adjacent to or most proximate the other film layer) to maintain contact with each other (with the oil disposed therebetween) by virtue of the viscosity and/or surface tension of the oil, such that the integrated valve is biased towards the closed position shown in FIG. 4A when the pressure inside the package is below a certain threshold pressure. For example, in some embodiments, the volume of oil 60 disposed between the first and second film layers 35, 40 is selected such that the valve opens when the pressure inside the package just exceeds the atmospheric pressure outside the package. An example of a desirable range of pressures inside the package for moving the first layer 35 towards the open position shown in FIG. 4B may be approximately 0.1 psi to approximately 1.5 psi.

In addition, when the atmospheric pressure outside the package is still slightly above the pressure inside the package, the valve should be configured to move from the open position to the closed position shown in FIG. 4A so as to seal and prevent gas and/or moisture from entering the package. In some embodiments, the valve is configured such that a desirable range of atmospheric pressures outside the package for moving the first layer 35 towards the closed position shown in FIG. 4A is approximately 0.05 psi to approximately 0.5 psi, but in any case is less than the pressure required inside the package to open the valve.

FIG. 5 discloses a cross-section of an exemplary valve area 20, as taken along line B-B of FIG. 3A. As can be seen in FIG. 5, the direct route between cut line 30 and cut line 25 is blocked by adhesive patch 52. Accordingly any escaping gasses must traverse around the adhesive 52 in order to move between line 30 and In some embodiments, an opposing surface of at least one of the first or second film layers 35, 40 may further include a surface treatment configured to decrease an amount of surface energy between the first and second film layers in the valve area. The surface energy may be characterized as the amount of energy required to adhere the opposing surfaces of the first and second film layers 35, 40 to each other. Thus, while the addition of the oil 60 in the valve area 20 between the opposing surfaces of the first and second film layers 35, 40 serves to increase the surface energy of the interface between the opposing film surfaces, the resulting surface energy may be too great to allow the valve to open at the desired pressure level of the package interior. The inclusion of the surface treatment for at least one of the opposing surfaces of the first and second film layers 35, 40, however, may counteract the increased adhesion force imparted by the oil 60, thereby reducing the surface energy to a level that allows the valve to be moved from the closed configuration to the open configuration when a desired level of pressure is achieved within the package.

In some embodiments, for example, the surface treatment may comprise at least one of a printed ink, a coating, or a texture that is applied to one or both of the opposing surfaces of the first and second film layers 35, 40. The surface treatment (e.g., the printed ink, coating, or texture) may serve to create bumps or ridges that extend from the surface of the respective film layer 35, 40 that is treated toward the opposing surface of the other film layer.

Accordingly, the surface energy of the interface between the first and second film layers 35, 40 may be decreased due to the reduced contact area between the two film layers. For example, instead of substantially the entire opposing surface of the first film layer 35 in the valve area contacting substantially the entire opposing surface of the second film layer 40 in the valve area, in which case the surface energy would be at a maximum, the ridges created by the surface treatment in some embodiments may reduce the contact area to the sum of the areas over which each of the ridges contacts the corresponding locations of the opposing surface of the respective film layer. The inventors have found that the smaller the contact area, the less energy is required to separate the first and second film layers 35, 40, and the less internal package pressure is needed to move the valve from the closed configuration to the open configuration. Accordingly, the type of surface treatment, the number of ridges created, and/or the amount of inherent separation between the first and second film layers 35, 40 caused by the extension of the ridges may be selected to achieve a desired surface energy that results in the opening of the valve at the desired package pressure. In addition, the pattern of the ridges may be selected to further tune the opening and closure of the valve, depending on the requirements of the package. In some cases, the thickness of the surface treatment (e.g., thickness of the coating used), the roughness imparted by the surface treatment (e.g., based on the chemical makeup of the surface treatment), and the location of the surface treatment may also affect the resulting surface energy.

The flexible laminate structure may include first and second film layers 35, 40 made of various different materials, depending on the particular application (e.g., depending on the type of product stored in the package). The first and/or second film layers 35, 40 may, for example, include a polymer. In some embodiments, for example, one of the first or second film layers 35, 40 may comprise polyethylene terephthalate (PET). In other embodiments, one of the first or second film layers 35, 40 may include oriented polypropylene (OPP). Other materials that may be used for the first or second film layers 35, 40 may include Polyethylene (PE), metal foil (e.g., aluminum), metallized oriented polypropylene (mOPP), metallized polyethylene terephthalate (mPET), and co-polymer polypropylene (CPP), to name a few. Accordingly, typical laminate structures may include, for example, PET/Foil/PE, PET/Foil/PET/PE, PET/mPET/PE, PET/mOPP/PE, OPP/mOPP/PE, PET/PE, OPP/PE, OPP/OPP, OPP, mOPP, PET/CPP, and PET/Foil/CPP.

In this regard, in some cases, the flexible laminate structure described above may be made using a first or second film layer 35, 40 (or both) that includes two or more sub-layers. One or both of the first and second film layers 35, 40 may, for example, be a 2-ply film, a 3-ply film, a 4-ply film, or include additional plies, depending on the particular application (e.g., depending on the type of product to be stored in the package), with some example structures as noted above. Sub-layers having different characteristics (e.g., different thicknesses, different materials, etc.) may be used in some cases to achieve certain oxygen and/or moisture transmission rates, so as to promote the freshness and/or shelf life of the product stored in the package. For example, the first film layer 35 may be a single-ply layer of PET, whereas the second film layer 40 may be a 3-ply film with sub-layers of foil/PET/PE.

Methods of manufacturing a flexible laminate structure for a package including an integrated one-way valve feature are also provided. According to embodiments of the methods, a first film layer may be laminated to a second film layer via a pattern-printed adhesive that is applied to at least one of the first or second film layers, as described above. The adhesive patches within the valve area which define the gas channel(s) may also be pattern applied at this stage.

A first cut line may be defined in the first film layer, and a second cut line may be defined in the second film layer, where the first and second cut lines are offset with respect to each other. The cut lines may be defined in the flexible laminate after the first and second film layers have been laminated to each other, such as by using precision scoring techniques. In this way, the manufacture of the integrated valve is simplified as compared to conventional methods of providing a valve on packaging, in which a separately-formed valve must be attached to the flexible laminate at a predefined location.

In this regard, the first and/or second cut lines may be made in various ways, such as via a laser. As an alternative to the use of lasers for scoring the laminate, the cut lines can be formed in the laminate by mechanical scoring or cutting. For instance, a kiss roll and a backing roll may be used to form a nip through which the laminate is passed. The kiss roll may comprise a rotary cutting die defining a cutting edge that is configured to define the first and/or second cut lines.

As the first and second film layers are laminated to each other, an area of the laminate is left devoid of the permanent adhesive so as to define the valve area, with the exception of the adhesive patch(es). As described above, the first and second cut lines are defined within the valve area, such that the valve area includes the first and second cut lines. In addition, oil may be pattern-applied to at least one of the first or second film layers in the area of the laminate devoid of the permanent adhesive.

As described above, the first and second film layers may comprise different materials, such as PET, OPP, or other polymer materials, as well as non-polymer material such as aluminum foil. Moreover, at least one of the first or second film layers may comprise two or more sub-layers.

In a particular embodiment, the method comprises determining the opening force that is required for a particular packaging application and setting the size and configuration of the adhesive patch based upon the required opening force. For example, if a greater opening force should be required, a greater amount of adhesive may be used for the adhesive patch. Similarly, if a lesser opening force is required, a lesser amount of adhesive may be used for the adhesive patch.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

Example 1

Table 1 illustrates experimental data obtained during a 72-hour testing phase for the inventive valves. Four packaging structures were tested—the first one with no valve, the second having a valve with no adhesive patch (i.e. devoid of adhesive), the third having a ½ inch channel (shown in FIG. 2B), and the fourth having a ¼ inch channel (shown in FIG. 2A).

The percentage of oxygen in the headspace was measured after 72 hours, indicating a release of gas from within the container into the container headspace above the valve (if present). This testing was repeated six times. One outlier was identified, the $4^{th}$ sample using the valve shown in FIG. 2B. This sample was believed to have a leak and was removed from the testing data set.

TABLE 1

| | 72 Hours | | | | | | | | |
|---|---|---|---|---|---|---|---|---|---|
| | Samples | | | | | | | | |
| Valve Design | 1 | 2 | 3 | 4 | 5 | 6 | Mean | Median | StDev |
| No Valve | 4.87 | 3.57 | 12.8 | 11.2 | 8 | 5.49 | 7.655 | 6.745 | 3.695612 |
| Valve - No Adhesive | 19.9 | 19.9 | 19.7 | 20 | 19.8 | 20 | 19.88 | 19.9 | 0.116905 |
| FIG. 2B (1/2" Channel) | 8.26 | 7.52 | 11.9 | N/A | 5.72 | 7.79 | 8.24 | 7.79 | 2.262039 |
| FIG. 2A (1/4" Channel) | 3.27 | 11.4 | 5.86 | 3.41 | 8.26 | 4.42 | 6.10 | 5.14 | 3.190001 |

As can be seen, the headspace of the containers having valves without adhesive in the valve area comprised approximately 20% oxygen, which is consistent with atmospheric pressure. In contrast, the pressure within the headspace of the containers comprising the valves shown in FIG. 2B comprised about 8.24% oxygen. The pressure within the headspace of the containers having the valves shown in FIG. 2A comprised about 6.1% oxygen over the same time period. Accordingly, the inventors have concluded that the valves shown in FIGS. 2A and 2B provided a significant reduction in the oxygen transmission rate over a similarly configured valve with no adhesive in the valve area. Similarly, the valve shown in FIG. 2A provided a reduction in the oxygen transmission rate over that of the valve shown in FIG. 2B.

Example 2

Table 2 illustrates data from a similar test, but conducted over a 7-day period. Two outliers were identified, the $2^{nd}$ and $3^{rd}$ sample using the valve shown in FIG. 2A. These samples were believed to have leaks and were removed from the testing data set.

TABLE 2

| | 7 Day | | | | | | |
|---|---|---|---|---|---|---|---|
| | Samples | | | | | | |
| Valve Design | 1 | 2 | 3 | 4 | Mean | Median | StDev |
| No Valve | 3.31 | 3.71 | 6.66 | N/A | 4.56 | 3.71 | 1.829617 |
| Valve - No Adhesive | 19.8 | 20 | 19.8 | N/A | 19.9 | 19.8 | 0.11547 |
| FIG. 2B (1/2" Channel) | 6.7 | N/A | N/A | 8.84 | 7.77 | 7.77 | 1.513209 |
| FIG. 2A (1/4" Channel) | 3.97 | 6.85 | 4.5 | N/A | 5.10 | 4.5 | 1.532851 |

As can be seen, the headspace for valves which contained no adhesive were measured to have about 20% oxygen over the course of 7 days. In contrast, the oxygen percentage in the headspace for the valves shown in FIG. 2B was about 7.8% oxygen over the same time period. The oxygen percentage in the headspace for the valves shown in FIG. 2A comprised about 5% oxygen over the same time period. Accordingly, the inventors have concluded that the valves shown in FIGS. 2A and 2B provide a significant reduction in the oxygen transmission rate over a similarly configured valve with no adhesive in the valve area. Similarly, the valve shown in FIG. 2A provided a reduction in the oxygen transmission rate over that of the valve shown in FIG. 2B.

Example 3

Table 3 illustrates data from a similar test, but conducted over a 17-day period. One outlier was identified, the $2^{nd}$ sample using the valve shown in FIG. 2A. This sample was believed to have a leak and was removed from the testing data set.

TABLE 3

| | 17 Day | | | | | | |
|---|---|---|---|---|---|---|---|
| | Samples | | | | | | |
| Variable | 1 | 2 | 3 | 4 | Mean | Median | StDev |
| No Valve | 6.5 | 4.37 | 3.29 | 3.15 | 4.3275 | 4.37 | 1.633371 |
| Valve - No Adhesive | 19.9 | 19.9 | 19.9 | N/A | 19.9 | 19.9 | 0 |
| FIG. 2B (1/2" Channel) | 17.2 | 9.34 | 7.68 | N/A | 11.40667 | 9.34 | 5.085365 |
| FIG. 2A (1/4" Channel) | 4.51 | N/A | 4.57 | N/A | 4.54 | 4.54 | 0.042426 |

As can be seen, the oxygen percentage in the headspace for the valves which contained no adhesive released comprised approximately 20% oxygen after 17 days, which continued to be consistent with atmospheric pressure. In contrast, the oxygen percentage in the headspace for the valves shown in FIG. 2B comprised about 11% oxygen over the same time period. The oxygen percentage in the headspace for the valves shown in FIG. 2A comprise about 4.5% oxygen over the same time period. Accordingly, the inventors have concluded that the valves shown in FIGS. 2A and 2B provide a significant reduction in the oxygen transmission rate over a similarly configured valve with no adhesive in the valve area. Similarly, the valve shown in FIG. 2A provided a reduction in the oxygen transmission rate over that of the valve shown in FIG. 2B.

Example 4

In this example, the opening and closing pressures of the valve shown in FIG. 2B and the valve shown in FIG. 2A were tested three times. FIGS. 9A and 9B illustrate these results and the average of the testing. The opening pressure required to open the valve shown in FIG. 2B was measured, on average, at between about 0.3 and 0.45 PSI (graph in FIG. 9A). In contrast, the opening pressure required to open the valve shown in FIG. 2A was measured, on average, at between about 1.0 and 1.1 PSI (graph in FIG. 9B). Thus, significantly greater opening pressure was required to open the valve set forth in the valve shown in FIG. 2A, as compared to the valve shown in FIG. 2B.

The illustrated embodiments are exemplary only, and other variations are contemplated where the first and/or second film do not have either a single linear score or a plurality of linear scores that are arranged parallel to each other. Other variations are contemplated so long as the necessary operation of the one-way valve is achieved when the flexible package buckles and deforms.

A flexible package may be formed with a one-way valve of the invention. The one-way valve may also be useful in rigid plastic or metal containers for food products, such as coffee, having a flexible peelable membrane seal adhered to a rim surrounding an open end of the container. A valve structure in accordance with the present disclosure may be formed in the membrane seal that will act as a seal to the container.

Many other modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A one-way valve for a flexible package, the one way valve comprising:
    a first film layer which comprises at least one first cut line;
    a second film layer which comprises at least one second cut line, wherein the at least one second cut line is offset from the at least one first cut line;
    an adhesive layer disposed between the first and second film layer, wherein the first film layer, the second film layer, and the adhesive layer define a valve area in which the first film layer and the second film layer are not permanently adhered to each other, wherein the at least one second cut line fluidly connects an interior of the flexible package to the valve area and the at least one first cut line fluidly connects the valve area to an ambient atmosphere surrounding the flexible package, wherein an adhesive pattern is disposed within the valve area and creates a gas flow channel from the at least one second cut line toward the at least one first cut line, wherein the adhesive pattern comprises at least one patch of adhesive which is surrounded, within the valve area, with an adhesive-free region; and
    an oil occupying the portions of the valve area which are not adhered via a permanent adhesive.

2. The one-way valve of claim 1, wherein the first film comprises an exterior layer of the flexible package and the second film comprises an interior film of the flexible package.

3. The one-way valve of claim 1, wherein the at least one patch of adhesive is disposed such that the gas flow channel extends around one or both sides of the patch of adhesive.

4. The one-way valve of claim 1, wherein the valve area has a closed shape.

5. The one-way valve of claim 1, wherein the at least one second cut line comprises a plurality of straight lines.

6. The one-way valve of claim 5, wherein the at least one first cut line comprises a semi-circle, and wherein the plurality of straight lines is disposed vertically beneath the at least one first cut line.

7. The one-way valve of claim 6, wherein the plurality of straight lines are vertical.

8. A one-way valve for a flexible package, the one way valve comprising:
    a first film layer which comprises at least one first cut line;
    a second film layer which comprises at least one second cut line, wherein the at least one second cut line is offset from the at least one first cut line;
    an adhesive layer disposed between the first and second film layer, wherein the first film layer, the second film layer, and the adhesive layer define a valve area in which the first film layer and the second film layer are not permanently adhered to each other, wherein the at least one second cut line fluidly connects an interior of the flexible package to the valve area and the at least one first cut line fluidly connects the valve area to an ambient atmosphere surrounding the flexible package, wherein an adhesive pattern is disposed within the valve area and creates a gas flow channel from the at least one second cut line toward the at least one first cut line, wherein the adhesive pattern comprises at least two patches of adhesive; and
    an oil occupying the portions of the valve area which are not adhered via a permanent adhesive.

9. The one-way valve of claim 8, wherein the at least two patches of adhesive comprise a first side and a second side and wherein one of the first side and the second side which is closest to the at least one second cut line is angled to direct gas flow toward the at least one first cut line.

10. The one-way valve of claim 8, wherein the at least two patches of adhesive are disposed at least partially horizontally outwardly of the at least one first and at least one second cut lines and between the vertical disposition of the first and second cut lines.

11. The one-way valve of claim 8, wherein the channel is between about ¼ inch and ½ inch, in a dimension between the at least two patches of adhesive.

12. The one-way valve of claim 8, wherein the channel is ⅜ inch, in a dimension between the at least two patches of adhesive.

13. The one-way valve of claim 8, wherein the at least two patches of adhesive extend into the valve area horizontally, from opposite sides of the valve area and create the gas flow channel between the at least two patches of adhesive.

14. The one-way valve of claim 13, wherein the at least two patches of adhesive are continuous with the adhesive layer defining the valve area.

15. The one-way valve of claim 8, wherein the at least two patches of adhesive each comprise an elongated semi-ovular shape with a first elongated side and a second elongated side and wherein one of the first elongated side and the second elongated side which is closest to the second cut line is angled upwardly, wherein the upward angle is defined starting from an edge of the second elongated side at a perimeter of the valve area and moving toward an end of the adhesive area nearest the channel.

16. The one-way valve of claim 15, wherein a distance between a vertical midpoint of the valve area and the edge of the second elongated side is approximately twice or exactly twice a distance between the vertical midpoint of the valve area and the first elongated side.

17. The one-way valve of claim 15, wherein the upward angle is between about 15° and 30°, with reference to a horizontal centerline of the valve area.

18. The one-way valve of claim 15, wherein the upward angle is about 20°, with reference to a horizontal centerline of the valve area.

19. A method for manufacturing a one-way valve for a flexible package, the method comprising:

providing a first film layer;
providing a second film layer;
pattern applying a permanent adhesive to one of the first or second film layer to adhere the first and second film layers, define a valve area by avoiding applying the adhesive to the valve area, and define at least one adhesive patch located within the valve area, wherein the at least one adhesive patch creates a gas flow channel, and wherein each of the at least one adhesive patch is surrounded, within the valve area, with an adhesive-free region;
laminating the first film layer to the second film layer using the permanent adhesive to form a laminated film;
cutting at least one first cut line in the first film layer, within the valve area;
cutting at least one second cut line in the second film layer, within the valve area, wherein the at least one second cut line is offset from the at least one first cut line and wherein the gas flow channel is disposed between the at least one first and at least one second cut lines;
applying an oil to the adhesive-free portions of the valve area, between the first and second film layers; and
forming the laminated film into a flexible package wherein the at least one second cut line fluidly connects an interior of the flexible package to the valve area and the at least one first cut line fluidly connects the valve area to an ambient atmosphere surrounding the flexible package.

20. The method of claim 19, wherein the at least one adhesive patch is disposed at least partially horizontally outwardly of the at least one first and at least one second cut lines and between a vertical disposition of the at least one first and at least one second cut lines.

21. The method of claim 19, wherein the at least one adhesive patch is at least two adhesive patches, and wherein the channel is between about ¼ inch and ½ inch, in a dimension between the at least two adhesive patches.

22. The method of claim 19, wherein the at least one adhesive patch is at least two adhesive patches, and wherein the channel is ⅜ inch, in a dimension between the at least two adhesive patches.

23. The method of claim 19, comprising two adhesive patches which each comprise an elongated semi-ovular shape with a first elongated side and a second elongated side, wherein one of the first elongated side and the second elongated side which is closest to the second cut line is angled upwardly, wherein the upward angle is defined starting from an edge of the second elongated side at a perimeter of the valve area and moving toward an end of the adhesive area nearest the channel.

24. The method of claim 23, wherein a distance between a vertical midpoint of the valve area and the edge of the second elongated side is approximately twice or exactly twice a distance between the vertical midpoint of the valve area and the first elongated side.

25. The method of claim 23, wherein the upward angle is between about 15° and 30°, with reference to a horizontal centerline of the valve area.

26. The method of claim 23, wherein the upward angle is about 20°, with reference to a horizontal centerline of the valve area.

27. A method for manufacturing a flexible package having a one-way valve, the method comprising:
providing a first film layer;
providing a second film layer;
determining a required opening pressure for the valve;
pattern applying a permanent adhesive to one of the first or second film layer to adhere the first and second film layers, define a valve area by avoiding applying the permanent adhesive to the valve area, and define two adhesive patches located within the valve area, wherein the two adhesive patches creates a gas flow channel, wherein a size and configuration of the two adhesive patches is selected based upon a desired opening pressure for the one-way valve;
laminating the first film layer to the second film layer using the permanent adhesive to form a laminated film;
cutting at least one first cut line in the first film layer, within the valve area;
cutting at least one second cut line in the second film layer, within the valve area, wherein the at least one second cut line is offset from the at least one first cut line and wherein the gas flow channel is disposed between the at least one first and at least one second cut lines;
applying an oil to the adhesive-free portions of the valve area, between the first and second film layers; and
forming the laminated film into a flexible package wherein the at least one second cut line fluidly connects an interior of the flexible package to the valve area and the at least one first cut line fluidly connects the valve area to an ambient atmosphere surrounding the flexible package.

28. The method of claim 27, wherein the method is adjustable such that a greater volume of adhesive is pattern applied as the two adhesive patches, if a higher opening pressure is desired.

29. The method of claim 27, wherein the method is adjustable such that a lesser volume of adhesive is pattern applied as the two adhesive patches, if a lower opening pressure is desired.

30. The method of claim 27, wherein if a desired opening pressure is between 0.2 and 0.5 PSI, the two adhesive patches are configured to create a channel with a width of about ½ inch, as measured between the two adhesive patches.

31. The method of claim 27, wherein if a desired opening pressure is between 1.0 and 1.5 PSI, the two adhesive patches are configured to create a channel with a width of about ¼ inch, as measured between the two adhesive patches.

32. The method of claim 27, wherein if a desired opening pressure is between 0.5 and 1.0 PSI, the two adhesive are configured to create a channel with a width of about ⅜ inch, as measured between the two adhesive patches.

* * * * *